US007881410B2

(12) United States Patent
Lee et al.

(10) Patent No.: US 7,881,410 B2
(45) Date of Patent: Feb. 1, 2011

(54) APPARATUS AND METHOD FOR DETECTING USER IN A COMMUNICATION SYSTEM

(75) Inventors: Jae-Hyok Lee, Seoul (KR); Evgeny Gontcharov, Suwan-si (KR); Jae-Ho Jeon, Seongnam-si (KR); Seung-Joo Maeng, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1149 days.

(21) Appl. No.: 11/477,040

(22) Filed: Jun. 28, 2006

(65) Prior Publication Data

US 2007/0002959 A1 Jan. 4, 2007

(30) Foreign Application Priority Data

Jun. 29, 2005 (KR) .................... 10-2005-0056987

(51) Int. Cl.
*H04L 27/06* (2006.01)
(52) U.S. Cl. .............. 375/340; 375/142; 375/259; 375/343; 375/345; 375/355; 375/260; 375/267
(58) Field of Classification Search ........... 375/260, 375/142, 259, 343, 345, 355
See application file for complete search history.

(56) References Cited

U.S. PATENT DOCUMENTS

| 7,336,647 | B2 * | 2/2008 | Muharemovic et al. ..... 370/350 |
| 7,428,273 | B2 * | 9/2008 | Foster ........................ 375/329 |
| 7,436,906 | B2 * | 10/2008 | Goto ........................... 375/316 |
| 2005/0030931 | A1 * | 2/2005 | Sung et al. .................. 370/342 |
| 2006/0172716 | A1 * | 8/2006 | Yoshii et al. ............. 455/226.1 |

FOREIGN PATENT DOCUMENTS

| JP | 10-126288 | 5/1998 |
| JP | 11-251960 | 9/1999 |
| JP | 11-261443 | 9/1999 |
| JP | 2000-134176 | 5/2000 |
| JP | 2003-188849 | 7/2003 |
| JP | 2003-218737 | 7/2003 |
| JP | 2004-304618 | 10/2004 |
| JP | 2005-045628 | 2/2005 |
| KR | 1020040036102 | 4/2004 |
| KR | 1020050025897 | 3/2005 |
| WO | WO 02/39610 | 5/2002 |
| WO | WO2004/082182 | * 9/2004 |

\* cited by examiner

*Primary Examiner*—Shuwang Liu
*Assistant Examiner*—Dhaval Patel
(74) *Attorney, Agent, or Firm*—The Farrell Law Firm, LLP

(57) ABSTRACT

Disclosed is a method for detecting a user in a communication system. The method includes selecting i ranging sub-carrier signals among k sub-carrier signals upon which a k-point fast Fourier transform (FFT), has been performed multiplying the i ranging sub-carrier signals by a ranging code, performing k-point inverse fast Fourier transform (IFFT) on the i ranging sub-carrier signals multiplied by the ranging code, and (k-i) 0s, detecting a power of each of the IFFT-processed k point signals, estimating a power of a desired received signal and a power of an interference signal by using powers of the k point signals according to a predetermined scheme, and detecting a user depending on the power of the desired received signal and the power of the interference signal.

10 Claims, 4 Drawing Sheets

APPARATUS AND METHOD FOR DETECTING USER IN A COMMUNICATION SYSTEM

PRIORITY

This application claims priority under 35 U.S.C. §119(a) to an application filed in the Korean Intellectual Property Office on Jun. 29, 2005 and assigned Serial No. 2005-56987, the contents of which are incorporated herein by reference.

BACKGROUND OF THE INVENTION

1. Field of the Invention

The present invention relates generally to a communication system, and in particular, to an apparatus and method for detecting a user in a communication system.

2. Description of the Related Art

Generally, the next generation communication system is being developed provide a service capable of transmitting/receiving high-speed, high-capacity data to/from mobile stations (MSs). An Institute of Electrical and Electronics Engineers (IEEE) 802.16e communication system is one of the typical next generation communication systems.

A configuration of the IEEE 802.16e communication system will be described hereinbelow with reference to FIG. 1.

FIG. 1 is a block diagram illustrating a configuration of a typical IEEE 802.16e communication system.

Referring to FIG. 1, the IEEE 802.16e communication system has a multi-cell configuration, i.e., includes a cell 100 and a cell 150, and further includes a base station (BS) 110 for managing the cell 100, a BS 140 for managing the cell 150, and a plurality of MSs 111, 113, 130, 151, and 153. Signal exchanges between the BSs 110 and 140 and the MSs 111, 113, 130, 151, and 153 are achieved using an Orthogonal Frequency Division Multiplexing (OFDM)/Orthogonal Frequency Division Multiple Access (OFDMA). In the following description, it is assumed that the IEEE 802.16e communication system uses OFDMA.

In the IEEE 802.16e communication system, the ranging, especially initial ranging and periodic ranging serve as an important factors to consider. Initial ranging and periodic ranging serve are important factors because they affect user detection and definition of a user parameter, especially a propagation delay parameter, such as a Signal-to-Interference and Noise Ratio (SINR). If the user parameter estimation suffers from an error, sync acquisition fails. As a result, the signal transmitted/received by a corresponding BS serves as interference to sub-channel signals of neighbor BSs, reducing not only the ranging performance but also the overall performance of the IEEE 802.16e communication system.

The IEEE 802.16e communication system, as it uses OFDM/OFDMA, requires ranging sub-channels and ranging codes in order to perform the ranging, and a BS allocates available ranging codes for each type of the ranging. The ranging types are classified into initial ranging, periodic ranging, and bandwidth request ranging. Information on the allocated ranging codes is broadcast to MSs by the BS, and the MSs perform ranging by using the ranging codes according to their purposes based on the information on the ranging codes broadcast by the BS.

Although the ranging codes are classified according to their purposes as described above, the MS uses only a randomly selected one of the classified ranging codes. As a result, in some cases, the same ranging codes transmitted by different MSs may collide with each other. The collision causes not only a decrease in the SINR, but also other problems.

Therefore, in order to correctly estimate the user parameter, it is necessary not only to correctly detect the users performing the ranging, especially the initial ranging and periodic ranging, but also to correctly detect propagation delays of the detected users performing the initial ranging and periodic ranging. Accordingly, there is a need for a system and method for correctly detecting the users performing the initial ranging and periodic ranging, and correctly detecting propagation delays of the detected users performing the initial ranging and periodic ranging.

SUMMARY OF THE INVENTION

It is, therefore, an object of the present invention to provide an apparatus and method for detecting a user in a communication system.

It is another object of the present invention to provide an apparatus and method for detecting a propagation delay of a user in a communication system.

According to an aspect of the present invention, there is provided an apparatus for detecting a user in a communication system. The apparatus includes a ranging sub-carrier selector for selecting i ranging sub-carrier signals among k sub-carrier signals that which were subject to a k-point fast Fourier transformation (FFT); a multiplier for multiplying the i ranging sub-carrier signals by a ranging code; an inverse fast Fourier transform (IFFT) unit for performing k-point IFFT on the i ranging sub-carrier signals multiplied by the ranging code, and (k-i) 0s; a norm operator for detecting a power of each of the IFFT-processed k point signals; a desired received signal/interference signal power estimator for estimating a power of a desired received signal and a power of an interference signal by using powers of the k point signals according to a predetermined scheme; and a user detector for detecting a user depending on the power of the desired received signal and the power of the interference signal.

According to another aspect of the present invention, there is provided a method for detecting a user in a communication system. The method includes the steps of selecting i ranging sub-carrier signals among k sub-carrier signals that gave been subject to a k-point fast Fourier transformation (FFT); multiplying the i ranging sub-carrier signals by a ranging code; performing k-point inverse fast Fourier transform (IFFT) on the i ranging sub-carrier signals multiplied by the ranging code, and (k-i) 0s; detecting a power of each of the IFFT-processed k point signals; estimating a power of a desired received signal and a power of an interference signal by using powers of the k point signals according to a predetermined scheme; and detecting a user depending on the power of the desired received signal and the power of the interference signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention is directed to an apparatus and method for detecting a user, i.e., a mobile station (MS) that performs ranging, for example, initial ranging or periodic ranging in a communication system such as the Institute of Electrical and Electronics Engineers (IEEE) 802.16e communication system, which is a Broadband Wireless Access (BWA) communication system. Additionally the present invention is directed to an apparatus and method for detecting a propagation delay of the MS that performs the initial ranging or periodic ranging in the IEEE 802.16e communication system. Although the present invention will be described with reference to the IEEE 802.16e communication system for convenience, the present invention can be applied not only to the IEEE 802.16e communication system but also to other communication systems.

Figure 1:
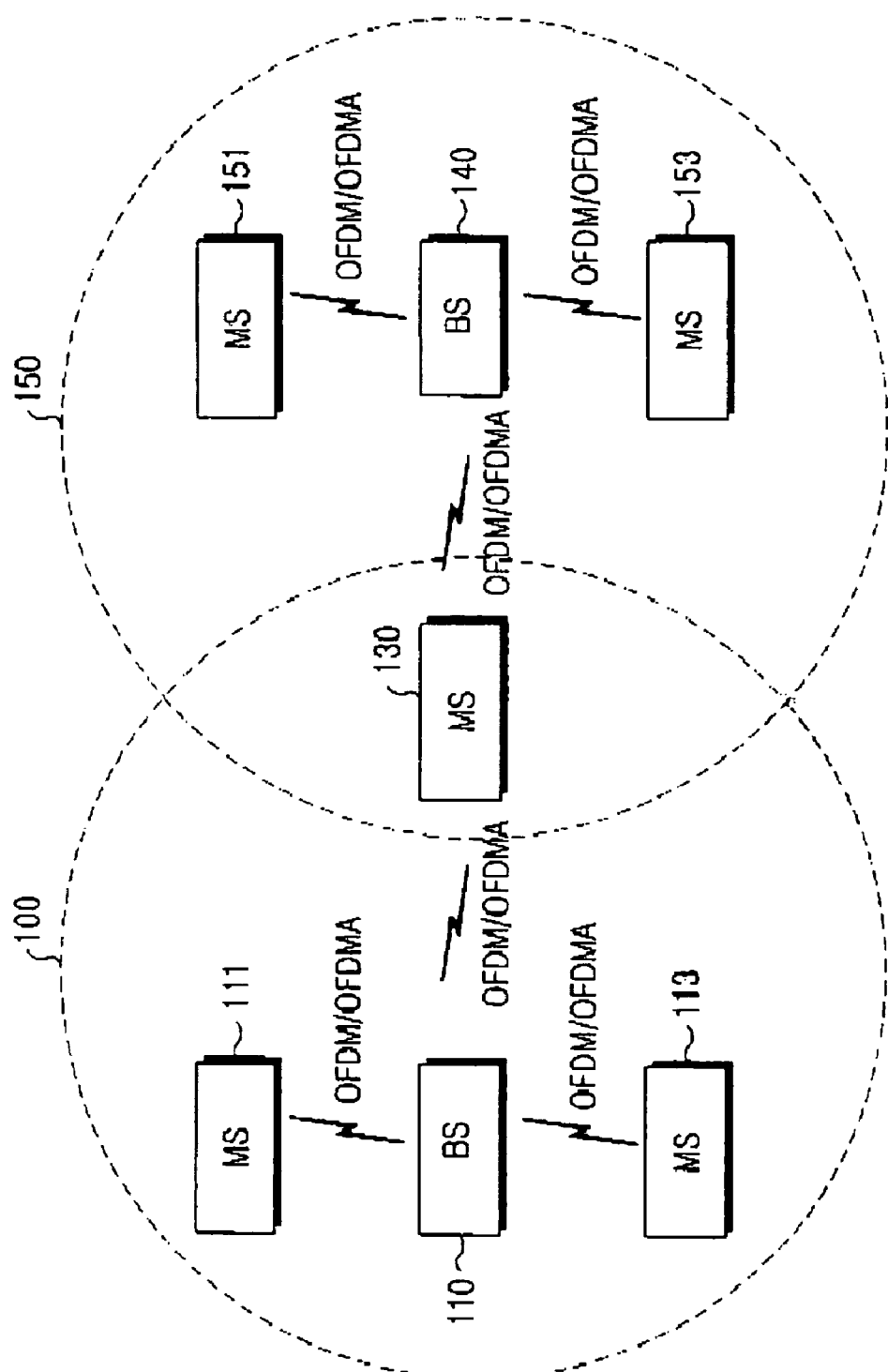
FIG. 1 is a block diagram illustrating a configuration of a general IEEE 802.16e communication system.
Figure 2:
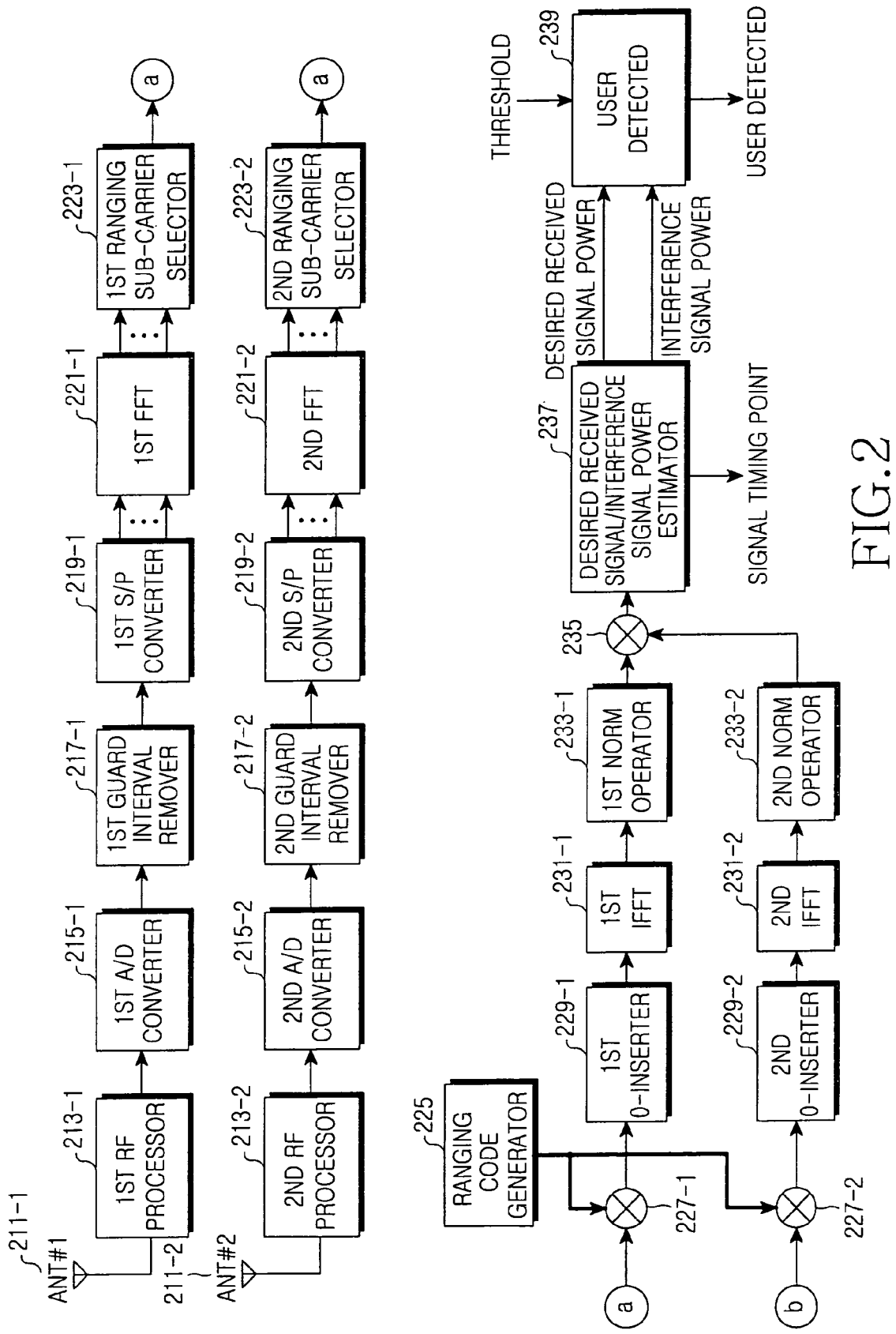
FIG. 2 is a block diagram illustrating an internal structure of a user detection apparatus according to the present invention.

FIG. 2 is a block diagram illustrating an internal structure of a user detection apparatus according to the present invention.

Before a description of FIG. 2, it will be assumed in present invention that the IEEE 802.16e communication system uses a Multiple Input Multiple Output (MIMO) technology. In addition, it will be assumed that the user detection apparatus is included in a base station (BS) of the IEEE 802.16e communication system, and the BS uses a plurality of, for example, 2 reception antennas.

Referring to FIG. 2, the user detection apparatus includes a first antenna (ANT#1) 211-1 and a second antenna (ANT#2) 211-2, a first Radio Frequency (RF) processor 213-1 and a second RF processor 213-2, a first analog-to-digital (A/D) converter 215-1 and a second A/D converter 215-2, a first guard interval remover 217-1 and a second guard interval remover 217-2, a first serial-to-parallel (S/P) converter 219-1 and a second S/P converter 219-2, a first Fast Fourier Transform (FFT) unit 221-1 and a second FFT unit 221-2, a first ranging sub-carrier selector 223-1 and a second ranging sub-carrier selector 223-2, a ranging code generator 225, a first multiplier 227-1 and a second multiplier 227-2, a first O-inserter 229-1 and a second O-inserter 229-2, a first Inverse Fast Fourier Transform (IFFT) unit 231-1 and a second EFFT unit 231-2, a first norm operator 233-1 and a second norm operator 233-2, an adder 235, a desired received signal/interference signal power estimator 237, and a user detector 239.

The signals transmitted by MSs in the cell coverage managed by a particular BS of the IEEE 802.16e communication system are received via the first antenna 211-1 and the second antenna 211-2 after experiencing additive white Gaussian noises (AWGN) through a multi-path channel. The signal received via the first antenna 211-1 is delivered to the first RF processor 213-1, and the signal received via the second antenna 211-2 is delivered to the second RF processor 213-2.

The first RF processor 213-1 down-converts the signal provided from the first antenna 211-1 to an Intermediate Frequency (IF) band, and outputs the IF signal to the first A/D converter 215-1. The first A/D converter 215-1 digital-converts the signal output from the first RF processor 213-1, and outputs the digital signal to the first guard interval remover 217-1. The first guard interval remover 217-1 removes a guard interval signal from the output signal of the first A/D converter 215-1, and outputs the resultant signal to the first S/P converter 219-1. The guard interval signal is a signal inserted by a Cyclic Prefix technique for copying a predetermined number of last samples of an OFDM symbol in a time domain and inserting the copied samples in a valid OFDM symbol, or inserted by a Cyclic Postfix technique for copying a predetermined number of first samples of an OFDM symbol in the time domain and inserting the copied samples in a valid OFDM symbol. For the sake of clarity, a detailed description of the guard interval signal will not be provided herein.

The first S/P converter 219-1 parallel-converts the signal output from the first guard interval remover 217-1, and outputs the parallel signal to the first FFT unit 221-1. The first FFT unit 221-1 performs an FFT on the signal output from the first S/P converter 219-1, and outputs the FFT-processed signal to the first ranging sub-carrier selector 223-1. It is assumed herein that the first FFT unit 221-1 performs a k-point FFT, and can detect a frequency-domain spectrum of the signal received via the first antenna 211-1. The first ranging sub-carrier selector 223-1 selects only i ranging sub-carrier signals corresponding to a ranging sub-carrier from the output signal of the first FFT unit 221-1, and outputs the selected ranging sub-carrier signals to the first multiplier 227-1.

The first multiplier 227-1 multiplies the ranging sub-carrier signals output from the first ranging sub-carrier selector 223-1 by ranging codes output from the ranging code generator 225, and outputs the resultant signals to the first 0-inserter 229-1. Herein, the ranging code is composed of i elements, and the i elements of the ranging code are multiplied by the i ranging sub-carrier signals on a one-to-one basis. As a result, the first multiplier 227-1 serves as a correlator. The first 0-inserter 229-1 inserts 0s in the signal output from the first multiplier 227-1, and outputs the 0-inserted signal to the first IFFT unit 231-1. The first IFFT unit 231-1 performs a k-point IFFT on the signal output from the first 0-inserter 229-1, and outputs the 0-inserted signal to the first norm operator 233-1. The first norm operator 233-1 performs a norm operation on the signal output from the first IFFT unit 231-1 to calculate its power value, and outputs the power value to the adder 235. Herein, the norm operation represents a square operation of magnitude.

Similarly, the second RF processor 213-2 down-converts the signal provided from the second antenna 211-2 to an IF band, and outputs the IF signal to the second A/D converter 215-2. The second A/D converter 215-2 digital-converts the signal output from the second RF processor 213-2, and outputs the digital signal to the second guard interval remover 217-2. The second guard interval remover 217-2 removes a guard interval signal from the output signal of the second A/D converter 215-2, and outputs the resultant signal to the second S/P converter 219-2.

The second S/P converter 219-2 parallel-converts the signal output from the second guard interval remover 217-2, and outputs the parallel signal to the second FFT unit 221-2. The second FFT unit 221-2 performs an FFT on the signal output from the second S/P converter 219-2, and outputs the FFT-processed signal to the second ranging sub-carrier selector 223-2. It is assumed herein that the second FFT unit 221-2 performs a k-point FFT, like the first FFT unit 221-1, and can detect a propagation delay profile spectrum of the signal received via the second antenna 211-2. That is, when a propagation delay occurs in the time domain, frequency shift occurs in the frequency domain. Therefore, it is possible to estimate the propagation delay using the frequency shift. The second ranging sub-carrier selector 223-2 selects only i ranging sub-carrier signals corresponding to a ranging sub-carrier from the output signal of the second FFT unit 221-2, and outputs the selected ranging sub-carrier signals to the second multiplier 227-2.

The second multiplier 227-2 multiplies the ranging sub-carrier signals output from the second ranging sub-carrier selector 223-2 by ranging codes output from the ranging code generator 225, and outputs the resultant signals to the second 0-inserter 229-2. Herein, the ranging code is composed of i elements, and the i elements of the ranging code are multiplied by the i ranging sub-carrier signals on a one-to-one basis. As a result, the second multiplier 227-2 serves as a correlator. The second 0-inserter 229-2 inserts 0s in the signal output from the second multiplier 227-2, and outputs the 0-inserted signal to the second IFFT unit 231-2. The second IFFT unit 231-2 performs k-point IFFT on the signal output from the second 0-inserter 229-2, and outputs the 0-inserted signal to the second norm operator 233-2. The second norm operator 233-2 performs a norm operation on the signal output from the second IFFT unit 231-2 to calculate its power value, and outputs the power value to the adder 235.

The adder 235 adds, i.e., combines the signals output from the first norm operator 233-1 and the second norm operator 233-2, and outputs the combined signal to the desired received signal/interference signal power estimator 237. The desired received signal/interference signal power estimator 237 estimates power of a desired received signal and power of an interference signal using the signal output from the adder 235. An operation of estimating power of the desired received signal and power of the interference signal in the desired received signal/interference signal power estimator 237 will be described in detail hereinbelow.

The desired received signal/interference signal power estimator 237 segments the signal output from the adder 235 into two parts: a first part used for calculating power of the desired received signal and a second part used for calculating power of the interference signal. Herein, power of the desired received signal will be denoted by $E_s$, and power of the interference signal will be denoted by N. The power $E_s$ of the desired received signal is a value obtained by averaging powers of $N_{max}$ samples including the sample having the maximum power in the signal output from the adder 235. The power N of the interference signal is a value obtained by averaging powers of $N_{min}$ samples including the sample having the minimum power in the signal output from the adder 235. Herein, the $N_{max}$ and $N_{min}$ can be determined by various schemes, and a detailed description thereof will be made hereinbelow.

A first scheme determines each of the $N_{max}$ and $N_{min}$ as a predetermined number. The signal output from the adder 235 has k points because it is a signal obtained by adding up k-point signals (i.e., k sample signals) output from the first norm operator 233-1 and the second norm operator 233-2. For example, if $N_{max}$=1 and $N_{min}$=k=1024, the desired received signal/interference signal power estimator 237 estimates power of the point signal having the maximum power among the k point signals output from the adder 235 as power $E_s$ of the desired received signal. In addition, the desired received signal/interference signal power estimator 237 estimates power N of the interference signal by averaging powers of the k point signals, i.e. 1024 point signals, output from the adder 235. In the first scheme, if each of the $N_{max}$ and $N_{min}$ is set to 1, the desired received signal/interference signal power estimator 237 estimates power of the point signal having the maximum value in the signal output from the adder 235 as the power $E_s$ of the desired received signal, and estimates power of the point signal having the minimum value in the signal output from the adder 235 as the power N of the interference signal. As a result, the first scheme can estimate the power $E_s$ of the desired received signal and the power N of the interference signal in a simple manner.

A second scheme determines the $N_{max}$ and $N_{min}$ taking predetermined threshold powers into account. The predetermined threshold powers include a first threshold power used for determining the $N_{max}$ and a second threshold power used for determining the $N_{min}$. The desired received signal/interference signal power estimator 237 selects all points having a power higher than or equal to the first threshold power among the k point signals output from the adder 235, and determines the number of all the selected points as $N_{max}$. In addition, the desired received signal/interference signal power estimator 237 selects all points having a power lower than or equal to the second threshold power among the k point signals output from the adder 235, and determines the number of all the selected points as $N_{min}$. Therefore, the desired received signal/interference signal power estimator 237 estimates the power $E_s$ of the desired received signal by averaging powers of the $N_{max}$ point signals, and estimates the power N of the interference signal by averaging powers of the $N_{min}$ point signals.

A third scheme determines each of the $N_{max}$ and $N_{min}$ as a predetermined number, like the first scheme, taking into account 2 consecutive point signals having the maximum power difference among the signals output from the adder 235. That is, if $N_{max}$=1 and $N_{min}$=1, the desired received signal/interference signal power estimator 237 estimates the power $E_s$ of the desired received signal by defining a power of the point signal having the higher power out of the 2 consecutive point signals having the maximum power difference among the signals output from the adder 235 as a power of the point signal corresponding to the $N_{max}$. In addition, the desired received signal/interference signal power estimator 237 estimates the power N of the interference signal by defining a power of the sample having the lower power out of the 2 consecutive samples as a power of the point signal corresponding to the $N_{min}$.

In addition, the desired received signal/interference signal power estimator 237 estimates the point, i.e. sample point, having the maximum power as a timing point of the desired received signal.

As described above, the desired received signal/interference signal power estimator 237 outputs a timing point of the desired received signal, the power $E_s$ of the desired received signal, and the power N of the interference signal, and the power $E_s$ of the desired received signal and the power N of the interference signal are delivered to the user detector 239. The user detector 239 detects a user by comparing the power $E_s$ of the desired received signal and the power N of the interference signal provided from the desired received signal/interference signal power estimator 237 with a (predetermined) threshold h. The user detector 239 can detect the user in various methods, and a detailed description thereof will be made hereinbelow.

In a first method, the user detector 239 detects a user by comparing a ratio $E_s/N$ of the power $E_s$ of the desired received signal to the power N of the interference signal with the threshold h. That is, the user detector 239 detects a user associated with the corresponding ranging code if the $E_s/N$ exceeds the threshold h.

In a second method, the user detector 239 detects a user by comparing the power $E_s$ of the desired received signal with a product h*N of the threshold h and the power N of the interference signal. That is, the user detector 239 detects a user associated with the corresponding ranging code if the power $E_s$ of the desired received signal exceeds the h*N.

In a third method, the user detector 239 detects a user by comparing a ratio $E_s/h$ of the power $E_s$ of the desired received signal to the threshold h with the power N of the interference signal. That is, the user detector 239 detects a user associated with the corresponding ranging code if the $E_s/h$ exceeds the power N of the interference signal.

As described above, the user detector 239 can detect a user by comparing the ES/N with the threshold h, comparing the power $E_s$ of the desired received signal with the product h*N, or comparing the $E_s/h$ with the power N of the reference signal. The user detection operation is implemented most simply when the power $E_s$ of the desired received signal is compared with the product h*N. Therefore, with reference to FIG. 3, a description will be made of an internal structure of the user detector 239 that detects a user signal by comparing the power $E_s$ of the desired received signal with the product h*N.

Figure 3:
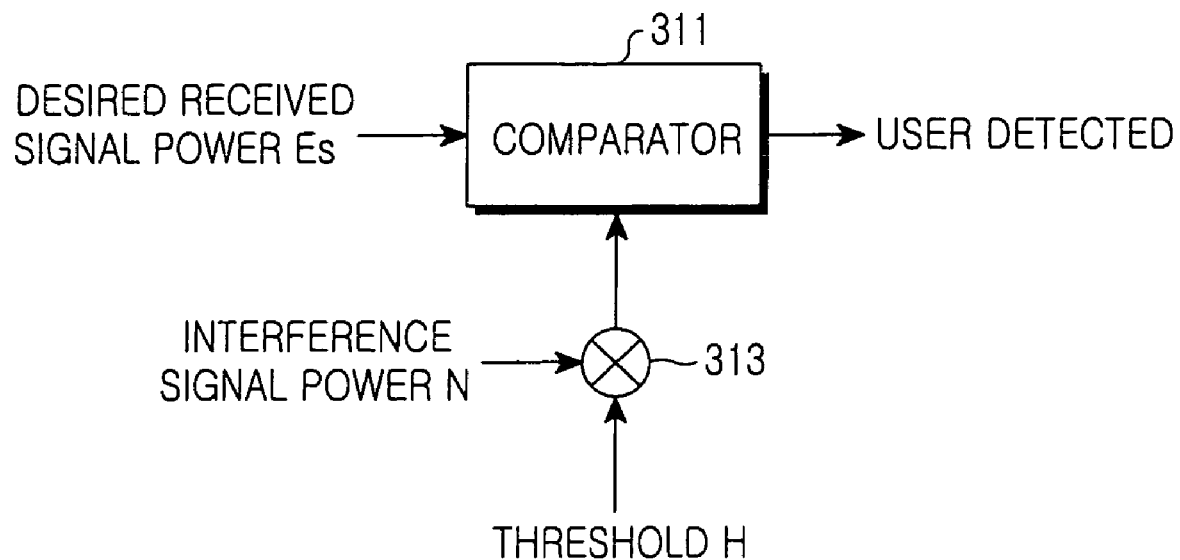
FIG. 3 is a block diagram illustrating an internal structure of the user detector of FIG. 2.

FIG. 3 is a block diagram illustrating an internal structure of the user detector 239 of FIG. 2.

The internal structure of the user detector 239 shown in FIG. 3 employs the second user detection method of detecting a user by comparing the power $E_s$ of the desired received signal with the product h*N of the threshold h and the power N of the interference signal. Referring to FIG. 3, the user detector 239 includes a comparator 311 and a multiplier 313.

The power $E_s$ of the desired received signal output from the desired received signal/interference signal power estimator 237 is input to the comparator 311, the power N of the inference signal is input to the comparator 313, and the threshold h is input to the multiplier 313. The multiplier 313 calculates a product h*N of the power N of the interference signal and the threshold h, and outputs the product h*N to the comparator 311. The comparator 311 compares the power $E_s$ of the desired received signal with the h*N, and detects a user associated with the corresponding ranging code if the power $E_s$ of the desired received signal exceeds the h*N.

Figure 4:
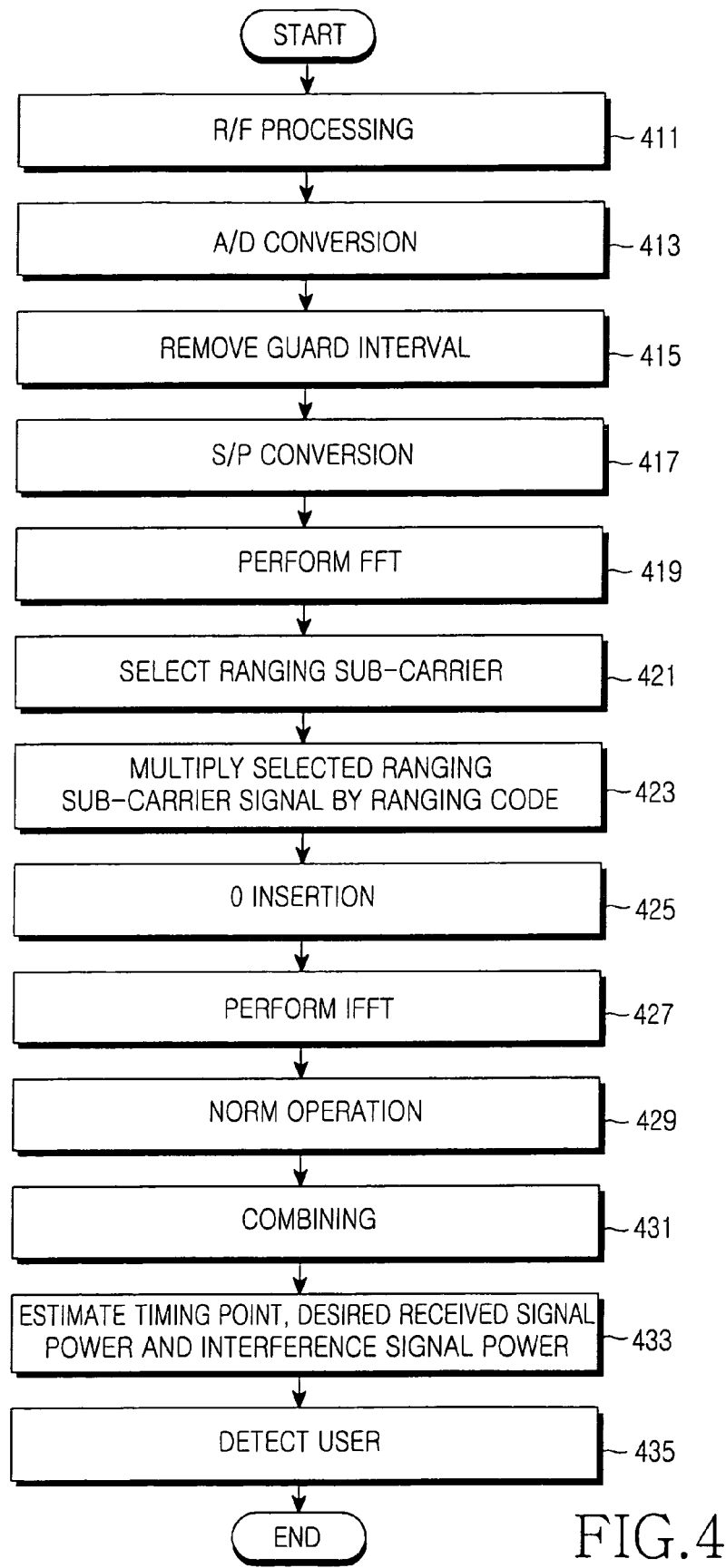
FIG. 4 is a flowchart illustrating a user detection operation according to the present invention.

With reference to FIG. 4, a description will now be made of a user detection operation according to the present invention.

FIG. 4 is a flowchart illustrating a user detection operation according to the present invention.

Referring to FIG. 4, in step 411, a user detection apparatus performs R/F processing on a signal received via each of a plurality of reception antennas. In step 413, the user detection apparatus performs A/D conversion on the R/F-processed signal. In step 415, the user detection apparatus removes a guard interval signal from the A/D-converted signal. In step 417, the user detection apparatus performs S/P conversion on the guard interval-removed signal.

In step 419, the user detection apparatus performs an FFT on the S/P-converted signal. In step 421, the user detection apparatus selects ranging sub-carrier signals from the FFT-processed signal. In step 423, the user detection apparatus multiplies the selected ranging sub-carrier signals by the corresponding ranging code. In step 425, the user detection apparatus inserts 0s in the product of the ranging sub-carrier signals and the ranging code.

In step 427, the user detection apparatus performs an IFFT on the 0-inserted signal. In step 429, the user detection apparatus performs a norm operation on the IFFT-processed signal to detect its power value. In step 431, the user detection apparatus combines the power values detected for individual reception antennas. In step 433, the user detection apparatus estimates a point, i.e. a sample point, having the maximum power in the combined signal as a timing point of the desired received signal, and also estimates a power of the desired received signal and a power of the interference signal. In step 435, the user detection apparatus finally detects a user association with the corresponding ranging code using the power $E_s$ of the desired received signal, the power N of the interference signal, and the threshold h.

As can be understood from the foregoing description, the communication system according to the present invention can correctly detect the users performing initial ranging or periodic ranging, thereby facilitating correct detection of user parameters and improving the overall system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for detecting a user in a communication system, the method comprising:

selecting i ranging sub-carrier signals among k sub-carrier signals upon which a k-point fast Fourier transform (FFT) has been performed, wherein each of i and k is a natural number;

multiplying the i ranging sub-carrier signals by a ranging code;

performing a k-point inverse fast Fourier transform (IFFT) on the i ranging sub-carrier signals multiplied by the ranging code, and (k-i) 0s;

detecting a power of each of the IFFT-performed k point signals;

estimating a power of a desired received signal and a power of an interference signal by using powers of the k point signals according to a predetermined scheme; and detecting a user depending on the power of the desired received signal and the power of the interference signal, wherein the step of estimating a power of a desired received signal and a power of an interference signal comprises:

estimating the power of the desired received signal using an averaging power of $N_{max}$ point signals among the powers of the k point signals; and estimating the power of the interference signal using an averaging power of $N_{min}$ point signals among the powers of the k point signals, wherein $N_{max}$ corresponds to a first predetermined number and $N_{min}$ corresponds to a second predetermined number, and wherein if $N_{max}=1$ and $N_{min}=1$, powers of the $N_{max}$ point signals indicate a power of a point signal having a higher power out of 2 consecutive point signals having a maximum power difference among the powers of the k point signals, and powers of the $N_{min}$ point signals indicate a power of a point signal having a lower power out of the 2 consecutive point signal.

2. The method of claim 1, wherein the step of detecting a user comprises detecting the user by comparing the power of the desired received signal with a product of a first threshold and the power of the interference signal.

3. The method of claim 1, wherein the step of detecting a user comprises detecting the user by comparing a ratio of the power of the desired received signal to the power of the interference signal with a second threshold.

4. The method of claim 1, wherein the step of detecting a user comprises detecting the user by comparing a ratio of the power of the desired received signal to a third threshold with the power of the interference signal.

5. The method of claim 1, further comprising estimating a point of a point signal having a maximum power among the k point signals as a timing point of the desired received signal.

6. An apparatus for detecting a user in a communication system, the apparatus comprising:

a ranging sub-carrier selector for selecting i ranging sub-carrier signals among k sub-carrier signals upon which a k-point fast Fourier transform (FFT) has been performed, wherein each of i and k is a natural number;

a multiplier for multiplying the i ranging sub-carrier signals by a ranging code;

an inverse fast Fourier transform (IFFT) unit for performing a k-point IFFT on the i ranging sub-carrier signals multiplied by the ranging code, and (k-i) 0s;

a norm operator for detecting a power of each of the IFFT-performed k point signals;

a desired received signal/interference signal power estimator for estimating a power of a desired received signal and a power of an interference signal by using powers of the k point signals according to a predetermined scheme; and a user detector for detecting a user depending on the power of the desired received signal and the power of the interference signal, wherein the desired received signal/interference signal power estimator estimates the power of the desired received signal using an averaging power of $N_{max}$ point signals among the powers of the k point signals, and estimates the power of the interference signal using an averaging power of $N_{min}$ point signals among the powers of the k point signals, wherein $N_{max}$ corresponds to a first predetermined number and $N_{min}$ corresponds to a second predetermined number, and wherein if $N_{max}=1$ and $N_{min}=1$, powers of the $N_{max}$ point signals indicate a power of a point signal having a higher power out of 2 consecutive point signals having a maximum power difference among the powers of the k point signals, and powers of the $N_{min}$ point signals indicate a power of a point signal having a lower power out of the 2 consecutive point signals.

7. The apparatus of claim 6, wherein the user detector detects the user by comparing the power of the desired received signal with a product of a first threshold and the power of the interference signal.

8. The apparatus of claim 6, wherein the user detector detects the user by comparing a ratio of the power of the desired received signal to the power of the interference signal with a second threshold.

9. The apparatus of claim 6, wherein the user detector detects the user by comparing a ratio of the power of the desired received signal to a third threshold with the power of the interference signal.

10. The apparatus of claim 6, wherein the desired received signal/interference signal power estimator estimates a point of a point signal having a maximum power among of the k point signals as a timing point of the desired received signal.

* * * * *